US009153264B1

(12) United States Patent
Oberg et al.

(10) Patent No.: US 9,153,264 B1
(45) Date of Patent: Oct. 6, 2015

(54) METHOD AND APPARATUS FOR DETERMINING RADIAL INCOHERENCE BETWEEN SERVO TRACKS

(71) Applicant: Marvell International Ltd., Hamilton (BM)

(72) Inventors: Mats Oberg, San Jose, CA (US); Richard Travis Behrens, Longmont, CO (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/563,578

(22) Filed: Dec. 8, 2014

Related U.S. Application Data

(60) Provisional application No. 61/915,806, filed on Dec. 13, 2013.

(51) Int. Cl.
*G11B 5/596* (2006.01)
(52) U.S. Cl.
CPC ........ *G11B 5/59655* (2013.01); *G11B 5/59627* (2013.01); *G11B 5/59638* (2013.01); *G11B 5/5965* (2013.01); *G11B 5/59633* (2013.01)

(58) Field of Classification Search
CPC .. G11B 5/59616; G11B 5/5965; G11B 5/746; G11B 5/59655; G11B 5/59633; G11B 5/59627; G11B 20/10; G11B 20/1866; G11B 20/1883; G11B 20/1879; G11B 27/36
USPC ........................ 360/48, 77.14, 31, 77.08, 135
See application file for complete search history.

(56) References Cited

U.S. PATENT DOCUMENTS

| 4,511,938 A * | 4/1985 | Betts ......................... 360/77.08 |
| 7,286,313 B2 * | 10/2007 | Erden et al. .................... 360/46 |
| 7,362,536 B1 * | 4/2008 | Liu et al. .................... 360/77.02 |

* cited by examiner

*Primary Examiner* — Ali Neyzari

(57) ABSTRACT

A method of operating or calibrating a storage device having a storage medium platter includes writing servo data to the storage medium platter, where the servo data include, for each track on the storage medium platter, a servo sync mark, and a repeating pattern. For each pair of adjacent tracks on the storage medium platter, the repeating patterns, which may be orthogonal, are compared to determine relative phase of the repeating patterns on adjacent tracks. The relative phase for each pair of adjacent tracks is recorded. In another calibration method, first and second repeating patterns may compared to determine whether relative phase of the first and second repeating patterns exceeds a threshold, in which case the second servo data are erased, new second servo data are written, and the comparing and erasing are repeated until the relative phase of the first and second repeating patterns is less than the threshold.

19 Claims, 6 Drawing Sheets

METHOD AND APPARATUS FOR DETERMINING RADIAL INCOHERENCE BETWEEN SERVO TRACKS

CROSS REFERENCE TO RELATED APPLICATION

This claims the benefit of commonly-assigned U.S. Provisional Patent Application No. 61/915,806, filed Dec. 13, 2013, which is hereby incorporated by reference herein in its entirety.

FIELD OF USE

This disclosure relates to data storage systems of the type in which read and write heads move over the surface of a storage medium. More particularly, this disclosure relates to determining radial incoherence of servo data on adjacent tracks, to allow aligning of data on those tracks.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

In magnetic recording, as one example, reading and writing are performed by one or more heads that move relative to the surface of a storage medium. Many magnetic disk drives, for example, include a plurality of individual disks, or "platters," which may be two-sided—i.e., each platter can store data on each of its two sides. Therefore, such a disk drive would have at least two heads for each platter. Indeed, for each platter, there is normally at least one write head and at least one separate read head, so that such a disk drive normally has at least four heads per platter.

In a common configuration, all of the heads in a given disk drive are mounted on arms attached to a common actuator that controls the radial position of the heads (an angular, tangential or circumferential component of motion is provided by the rotation of the platters relative to the heads). This is true whether there is one or many platters, and one or multiple heads per platter.

In order to control the radial position selected by the actuator, each surface of each platter has distributed upon it positional information referred to as "servo" data. The servo data are commonly distributed in spaced-apart servo "wedges" (generally spaced equiangularly) on the platter surface. By reading the servo data as each servo wedge passes under the read head, the disk drive controller can determine the precise radial and angular position of the head and can feed back that determination to control the position of the read head or the write head, depending on the required operation. Among the servo data are sync marks, which are used to determine angular position. Separate instances of the sync mark are provided at different radial positions—i.e., for different tracks.

Data on adjacent tracks are generally independent from one another. However, as areal densities for magnetic data storage continue to increase, with tracks written in an overlapping or "shingled" fashion—e.g., in "two-dimensional magnetic recording" (TDMR)—it may be desirable to write adjacent tracks synchronously (i.e., with bits in both tracks starting at the same angular positions). However, the sync marks in the servo data for different tracks, which are used to determine the angular position on each track, also are not perfectly synchronous—a phenomenon known as "radial incoherence," which may be caused, e.g., by ambient vibration or temperature variations as servo data for different tracks are written.

SUMMARY

A method of operating a storage device having a storage medium platter includes writing servo data to the storage medium platter, where the servo data include, for each track on the storage medium platter, a servo sync mark, and a repeating pattern. For each pair of adjacent tracks on the storage medium platter, the repeating patterns are compared to determine relative phase of the repeating patterns on adjacent tracks. The relative phase for each pair of adjacent tracks is recorded.

A method of calibrating a storage device having a storage medium platter includes writing servo data to the storage medium platter, where the servo data include, for each track on the storage medium platter, a servo sync mark, and a repeating pattern. For each pair of adjacent tracks on the storage medium platter, the repeating patterns are compared to determine relative phase of the repeating patterns on adjacent tracks. The relative phase for each pair of adjacent tracks is recorded.

A storage device has a storage medium platter and is calibrated according to a method including writing servo data to the storage medium platter, where the servo data include, for each track on the storage medium platter, a servo sync mark, and a repeating pattern. For each pair of adjacent tracks on the storage medium platter, the repeating patterns are compared to determine relative phase of the repeating patterns on adjacent tracks. The relative phase for each pair of adjacent tracks is recorded.

A method of calibrating a storage device having a storage medium platter includes writing first servo data to a first track of the storage medium platter, where the first servo data include a first servo sync mark, and a first repeating pattern. Second servo data are written to a second track of the storage medium platter adjacent to the first track, where the second servo data include a second servo sync mark, and a second repeating pattern. The first and second repeating patterns are compared to determine relative phase of the first and second repeating patterns. When the relative phase of the first and second repeating patterns exceeds a threshold, the second servo data are erased, new second servo data are written, and the comparing and erasing are repeated until the relative phase of the first and second repeating patterns is less than the threshold. For each respective subsequent track, respective subsequent servo data are written to a respective subsequent track of the storage medium platter adjacent to a preceding track, where the respective subsequent servo data include a respective subsequent servo sync mark, and a respective subsequent repeating pattern. The respective subsequent repeating pattern and the immediately preceding respective subsequent repeating pattern are compared to determine relative phase of the respective subsequent repeating pattern and the immediately preceding respective subsequent repeating pattern. When the relative phase of the respective subsequent repeating pattern and the immediately preceding respective subsequent repeating pattern exceeds a threshold, the respective subsequent servo data are erased, new respective subsequent servo data are written, and the comparing and erasing of the respective subsequent servo data are repeated until the relative phase of the respective subsequent repeating pattern and the immediately preceding respective subsequent repeating pattern is less than the threshold.

For each pair of adjacent tracks on the storage medium platter, the repeating patterns on adjacent tracks in the pair of adjacent tracks may be orthogonal to one another.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which:

FIG. 3 is a schematic representation of an example of synchronous data tracks;

FIG. 4 is a schematic representation of an example of asynchronous data tracks;

DETAILED DESCRIPTION

Figure 1:
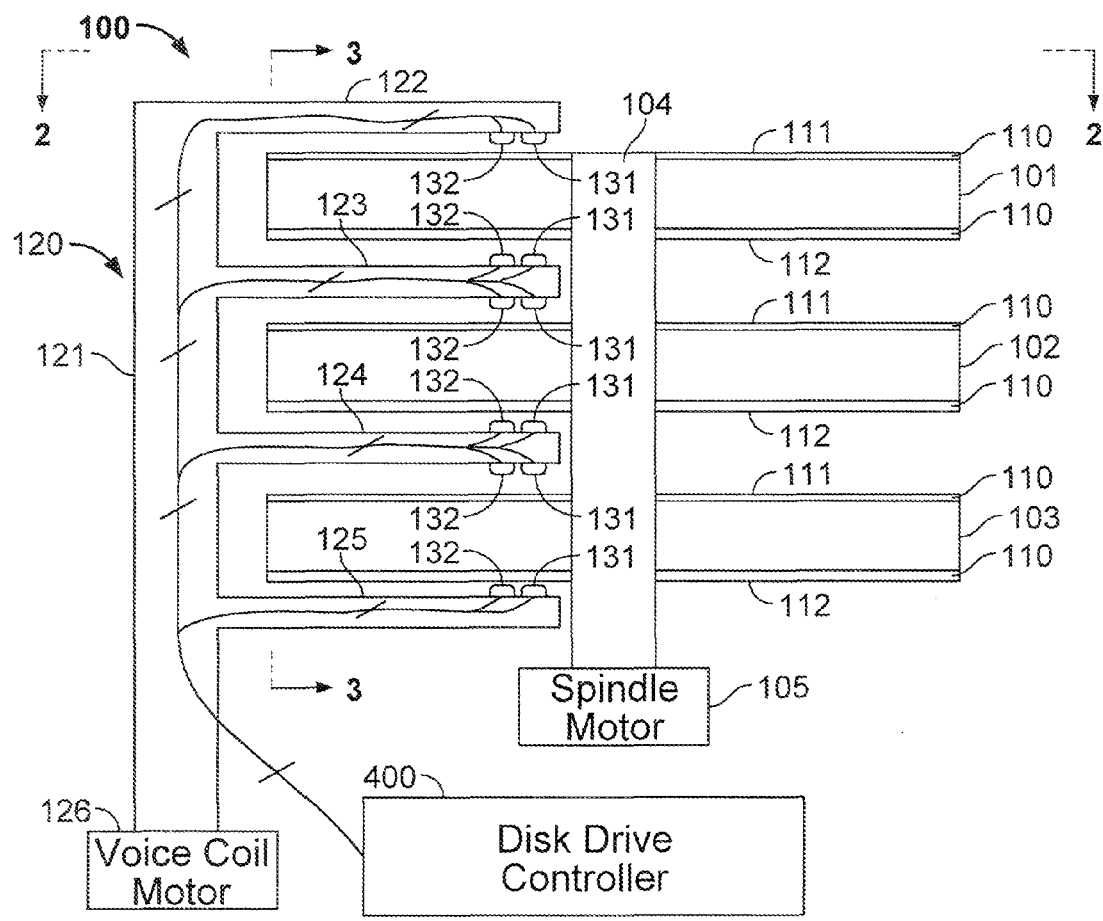
FIG. 1 is a side elevational view of a portion of a disk drive with which the present disclosure may be used.
Figure 2:
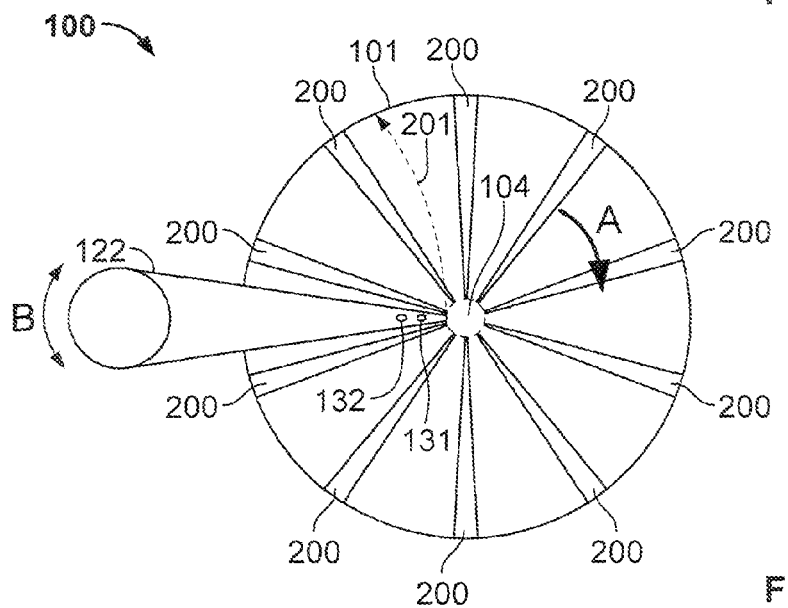
FIG. 2 is a plan view of the disk drive portion of FIG. 1, taken from line 2-2 of FIG. 1.

FIGS. 1 and 2 show an example of a disk drive 100 with which the present disclosure may be used. In this particular example, disk drive 100 has three platters 101, 102, 103, although any number of platters may be included in a disk drive with which the present disclosure may be used. As shown, each platter 101, 102, 103 has, on each of its upper and lower surfaces 111, 112, a coating 110 made from a material in which data can be stored, e.g., magnetically. The present disclosure also is relevant to a disk drive in which one or more platters includes coating 110 on only one of its surfaces, but such a disk drive would store less data in the same volume than a disk drive with two-sided platters. The platters 101-103 are mounted on a rotatable spindle 104. Motor 105 rotates spindle 104 to rotate platters 101-103 in the direction of arrow A (FIG. 2). Although motor 105 is shown connected directly to spindle 104, in some cases motor 105 may be located off-axis of spindle 104 and would be connected to spindle 104 through belts or gears (not shown).

Read/write head assembly 120 includes an actuator 121 that bears arms 122-125, one of which is disposed adjacent to each surface 111, 112 of a platter 101, 102, 103 that has a memory storage coating 110. In this example, with heads on both surfaces of each of arms 123, 124, that amounts to four arms 122-125, but in the single-sided platter example discussed above, there would be only three arms. In other examples, the number of arms would increase or decrease along with the number of platters.

Each arm 122-125 bears, at or near its end furthest from actuator 121, and on both its upper and lower surfaces in the case of arms 123, 124, a plurality of read heads/sensors and write heads. In this case, two sensors 131, 132 are shown, and will be used to represent read sensors, although it would normally at least be expected that each set of one or more read sensors has a companion write head (not shown). In the configuration shown in FIGS. 1 and 2, arms 122-125 are aligned along a radius of platters 101-103, bringing heads 131, 132 as close as they can get to spindle 104. It should be noted that FIGS. 1 and 2 are schematic only and not to scale. Normally, the spindle diameter would be larger by comparison to the disk diameter. Moreover, arms 122-125 normally cannot point directly at the center of the disk.

A motor 126, commonly referred to as a "voice-coil motor," rotates actuator 121 back and forth along the directions of arrow B (FIG. 2) to move the heads 131, 132 along the path indicated by dashed arrow 201. The motion of actuator 121 thus changes both the radial and circumferential positions of heads 131, 132, but the circumferential positional change is relatively unimportant insofar as the platters are rotating. The motion of actuator 121 thus is used to control the radial position of heads 131, 132.

The location on surface 111 of platter 101 (the other surfaces are similar) of the aforementioned wedges is shown in FIG. 2. Each servo wedge 200 includes data identifying it by wedge, or sector, number (to give an angular, tangential or circumferential position) and by data representing, at each point along a radius of the platter, the distance from spindle 104, although sometimes some of this information is omitted from some of the wedges.

Figures 3, 4:
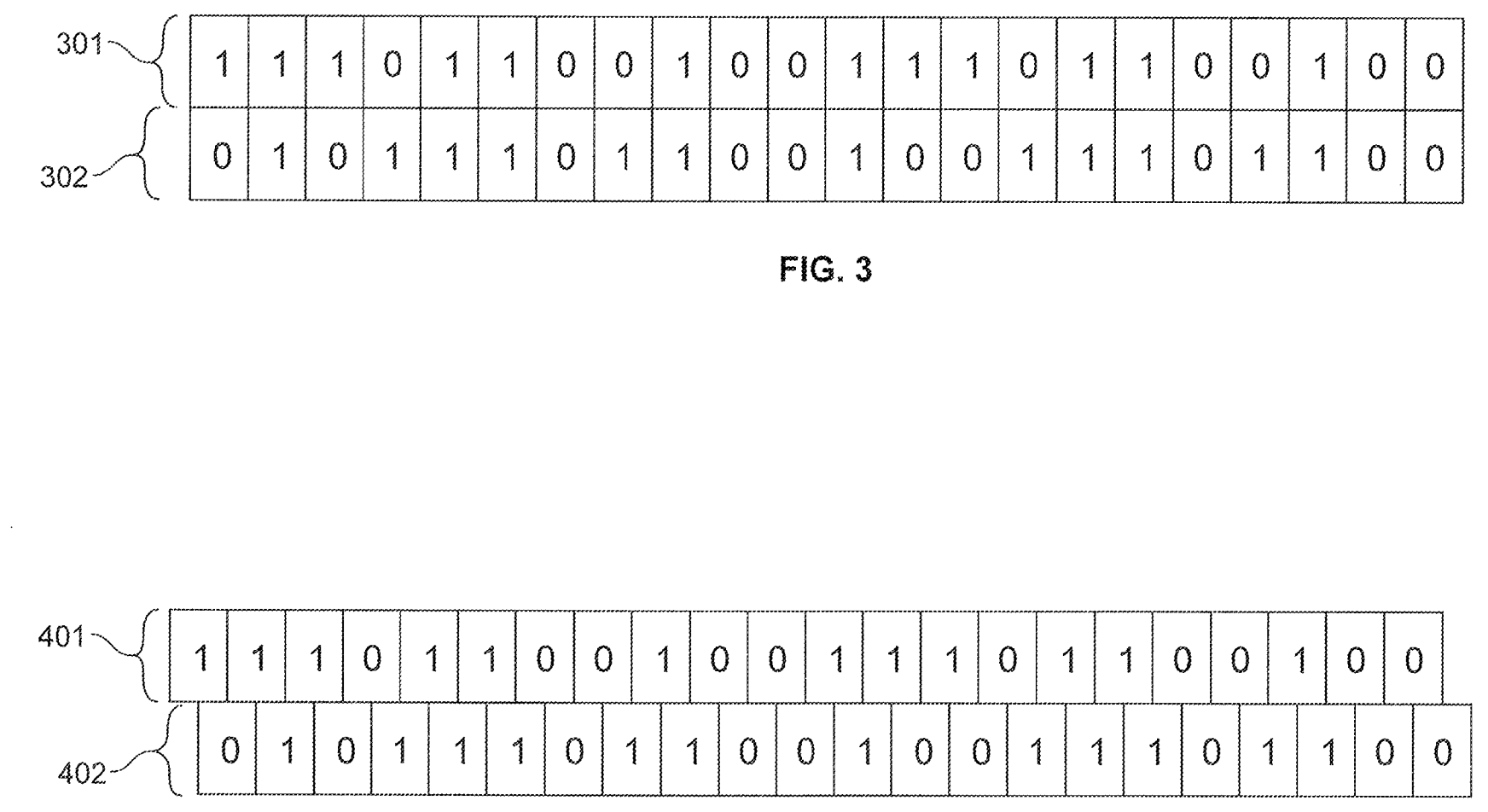

In certain situations, such as in two-dimensional magnetic recording, it may be desirable to write data on adjacent tracks synchronously—i.e., so that the bit edges on one track are synchronous with the bit edges on the adjacent track. This is illustrated in FIG. 3, where the bit edges on Track 0 (301) are synchronous with the bit edges on Track 1 (302).

If, as is normally the case, there is only one write head, then to write data synchronously to two adjacent tracks requires the two tracks to be written at different times. Thus, first track 301 is written on one rotation of the disk, then track 302 is written on the next or any subsequent rotation. In such a case, to achieve synchronously written data, the write clock should be well synchronized relative to the spindle speed, and the write start locations for tracks 301 and 302 need to be well synchronized. The latter requires precise information regarding locations of the servo sync marks. Once the sync mark locations are known, writing can be timed to begin a certain number of clocks after the detection of the servo sync mark.

However, because of radial incoherence in the servo data, the servo data may not be perfectly synchronous between the tracks. If the servo data between two adjacent tracks are radially incoherent, and each track is written at the same set delay following detection of the servo sync mark for that track, then any radial incoherence between the servo data for the two tracks will propagate to the data tracks, with the result shown in FIG. 4 where the edges of the bits in Track 0 (401) do not line up with the edges of the bits in Track 1 (402). However, if the degree of radial incoherence can be established, then the delay following sync mark detection can be adjusted for each track, to achieve synchronous writing.

The servo wedge for each track typically contains a preamble sequence, a sync mark and position error signal (PES) data. Servo wedges for adjacent tracks are Gray coded, such that they differ in one symbol—the track number. As a result, if the two tracks are read together, with the read head straddling both tracks, the data typically are detected from the average location of the two tracks, with the differing symbol being indeterminate.

In accordance with this disclosure, when the servo wedges are written, the servo patterns are extended with a pattern that is orthogonal as between adjacent tracks (i.e., there is a pair of periodic patterns such that the inner product of the two patterns in question, when represented as sequences of write current polarities {−1,1}, over a window chosen to contain an integer number of periods of both patterns, is zero). For example, a 2T pattern (110011001100 . . . ) may be written to the servo wedge of each even-numbered track, while a 3T pattern (111000111000111000 . . . ) may be written to the servo wedge of each odd-numbered track, although any pair of periods where one period is not a multiple of the other may be selected. The relative phase of these two orthogonal tones (i.e., sinusoidal signals at the fundamental frequencies of the respective patterns) can be determined, and used to determine how much delay should be applied, for each track, between sync mark detection and write operations.

There are at least two ways to take the phase difference into account. For example, if the orthogonal tones are recorded directly following the respective sync marks, then the phase difference may by used directly to determine the difference between start times for synchronously writing the two tracks—i.e., the track with the earlier phase can be written on sync mark detection while writing can be delayed on the track with the later phase by an amount, following sync mark detection on that track, indicated by the phase difference. Alternatively, if the locations of the orthogonal tones are offset relative the sync marks, then each track can be written at a respective delay indicated by the phase difference of the respective orthogonal tone to the weighted average sync mark location described above. In this alternative, if, for example, the phase offset for one track is $\alpha\pi$ and the phase offset for the other track is $\beta\pi$ (normally, $-1<\alpha<+1$ and $-1<\beta<+1$), then for the one track, writing can be delayed by a duration consistent with a phase of $\alpha\pi$ and for the other track writing can be delayed by a duration consistent with a phase of $\beta\pi$. In each case, writing on both tracks can be further delayed by an identical constant time period, if desired (e.g., to make sure the heads have completely passed the servo wedge). If either $\alpha$ or $\beta$ is (or both $\alpha$ and $\beta$ are) negative, then the constant time period would be at least as long as the negative period (because writing cannot be pushed into the past).

Figure 5:
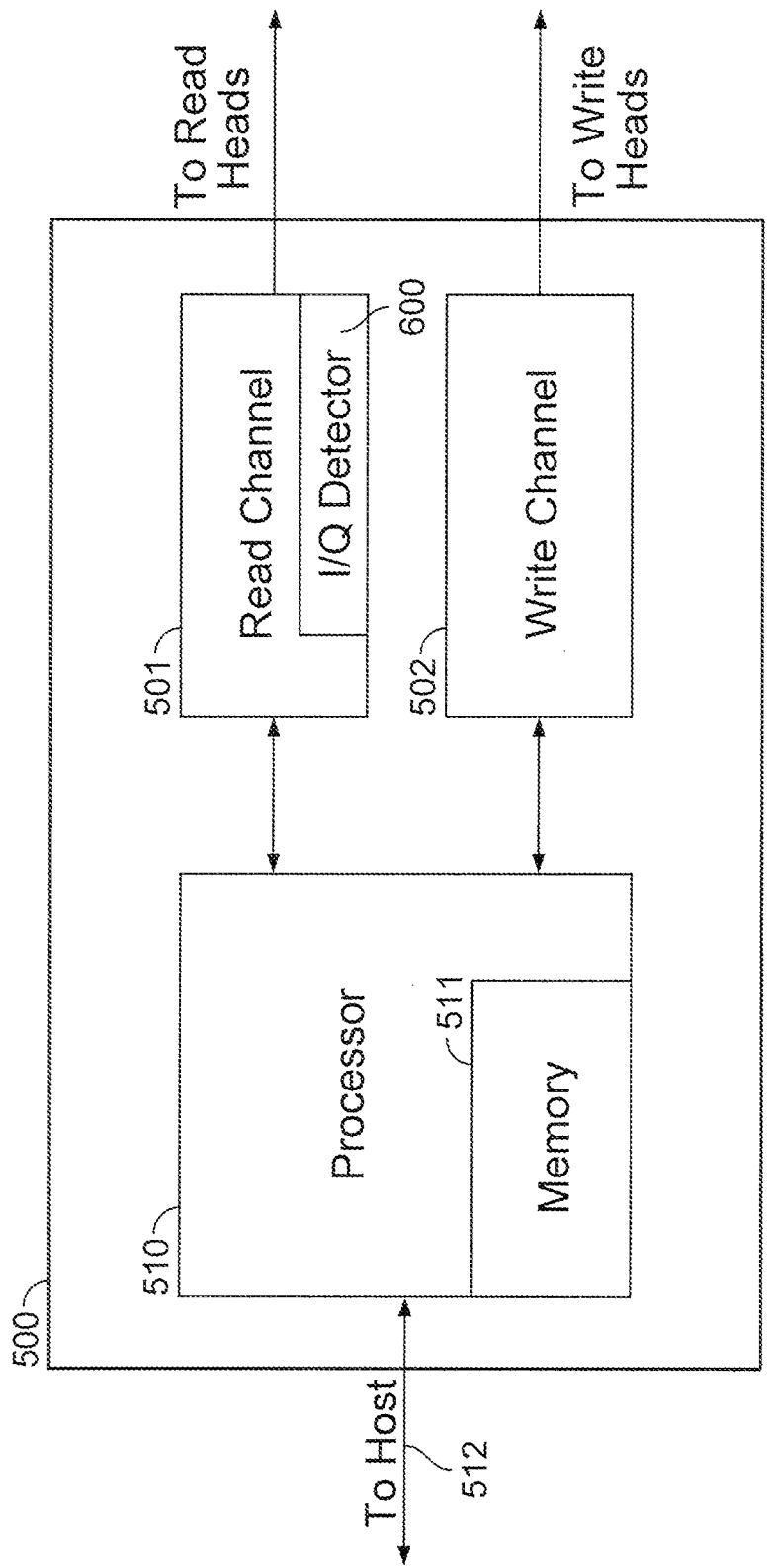
FIG. 5 is a schematic representation of a controller for the drive of FIGS. 1 and 2.

Each of read and write heads 131, 132 is connected to a read channel 501 and/or a write channel 502 of a hard drive controller 500 (FIG. 5). Hard drive controller 500 also includes a processor 510 and memory 511, as well as a connection 512 to a host processor (not shown). Memory 511 may be used to store the PES data that indicates the track position offsets. A servo control loop in hard drive controller 500 uses the PES data to keep the heads 131, 132 on track.

Figure 6:
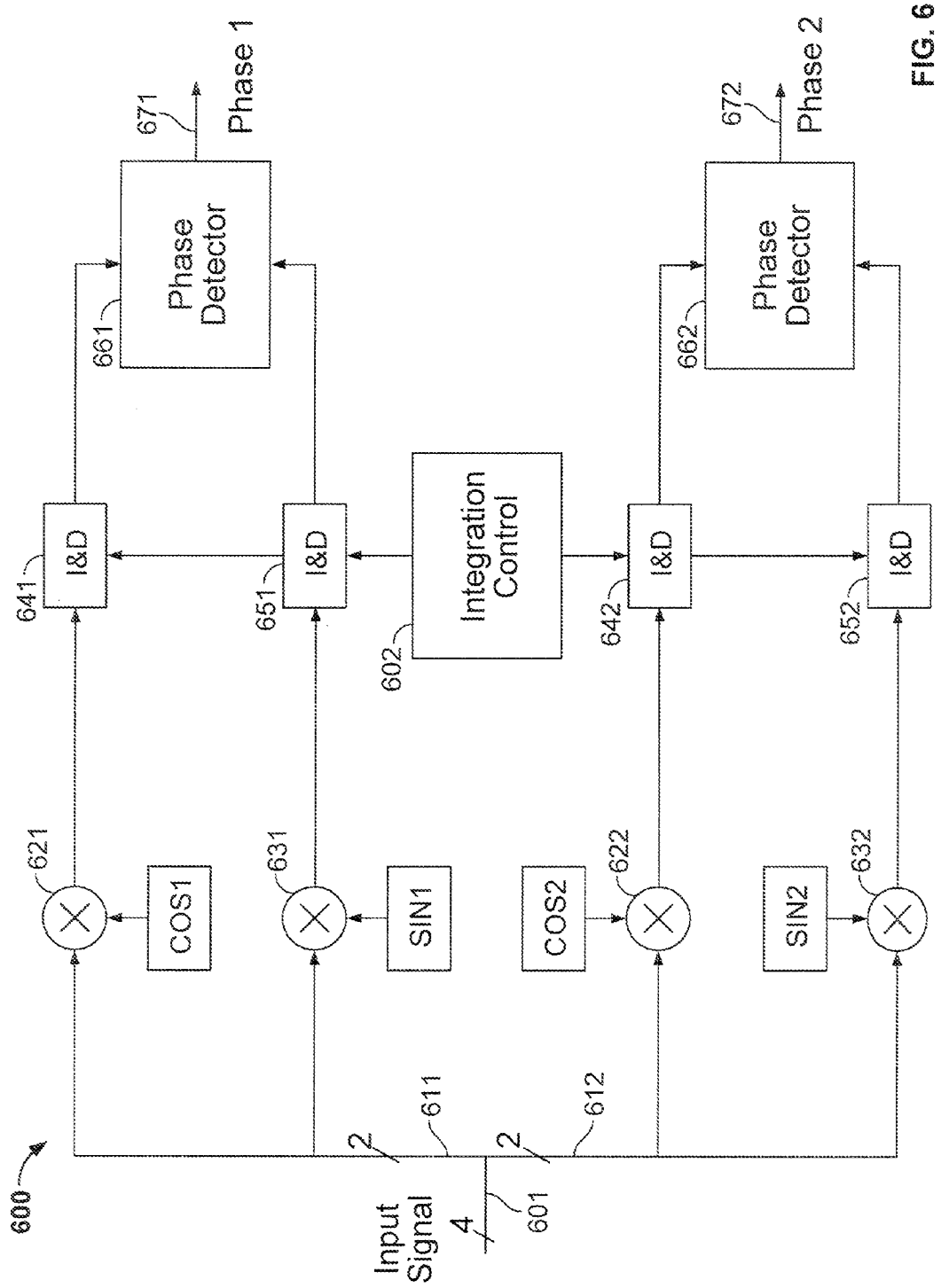
FIG. 6 is a schematic representation of an implementation of an I/Q demodulator circuit that may be used in apparatus according to this disclosure.

In accordance with an implementation of this disclosure, read channel 501 of hard drive controller 500 also includes I/Q detector 600, shown in more detail in FIG. 6, to determine the relative phases of the orthogonal tones. Read channel 501 will include, as is well known, an analog front end that will output mainly sinusoidal signals. In this case, the sinusoidal signal derived from the 2T tone (for, e.g., the even-numbered tracks) will have a period of 4T (1100), while the sinusoidal signal derived from the 3T tone (for, e.g., the odd-numbered tracks) will have a period of 6T (111000).

The two sinusoidal signals are input at 601, where they are directed onto 2T path 611 and 3T path 612. I/Q detector 600 removes the effect of the 2T signal in the 3T path 612, and the affect of the 3T signal in the 2T path 611. Signal 611 is multiplied at multipliers 621, 631 by cos 2n𝜋/(4T) and sin 2n𝜋/(4T), respectively, while signal 612 is multiplied at multipliers 622, 632 by cos 2n𝜋/(6T) and sin 2n𝜋/(6T), respectively. At integrators/down-filters 641, 651, 642, 652, those four resulting signals are integrated over a common period (e.g., in this case, the least common multiple would be a period of 12T) as determined by integration control 602. Respective phase detectors 661, 662 would use the integrated signals to determine respective phase signals 671, 672, which could be stored, e.g., in memory 511.

Hard drive controller 500 would then use phase signals 671, 672 as described above, to control writing. For example, processor 510 could use phase signals 671, 672 to determine a respective set of write delays for each adjacent track pair which can be stored, e.g., in memory 511 and used if synchronous writing to any track pair is desired.

Once phase signals 671, 672 have been determined once, during initial calibration of the disk drive, the orthogonal tones are no longer needed. Because they take up space on the recording medium, it may be desirable to mitigate the loss of space for user data. One way to do that would be to write the orthogonal tones to an area on the recording medium that is not available for writing because it is blocked by the read head. (The read head and the write head are typically separated in the along-track dimension by some about of spatial distance, and can typically not be operated simultaneously.) Another alternative is to erase the orthogonal tones after calibration (or simply make that space available for overwriting). For that reason, it may be desirable to write the orthogonal tones either at the beginning of the servo wedge (i.e., to prepend the tones to the wedge) or at the end of the servo wedge (i.e., to append the tones to the wedge).

Figure 7:
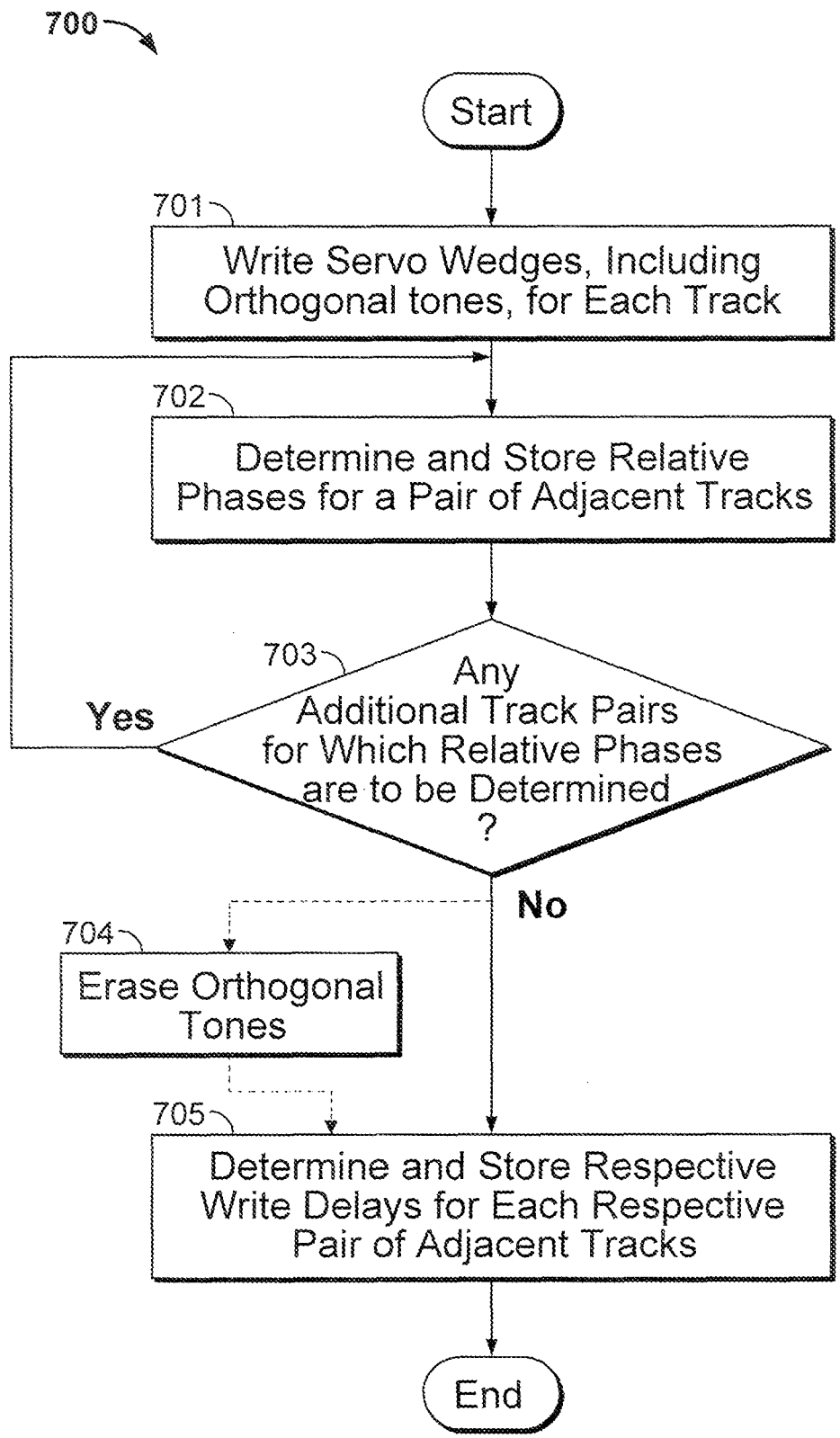
FIG. 7 is a flow diagram of an implementation of a method according to this disclosure and FIG. 8 is a flow diagram of an implementation of an alternate method according to this disclosure.

A method 700 of operating a disk drive according to this disclosure is diagrammed in FIG. 7. At 701, servo wedges, including orthogonal tones, are written for each track. At 702, for a pair of adjacent tracks, the relative phases are determined and stored (as described above). At 703 it is determined whether there are any additional track pairs for which relative phases are to be determined. If there are additional track pairs for which relative phases are to be determined, method 700 returns to 702 to determine and store those phases. If at 703 there are no additional track pairs for which relative phases are to be determined, method 700 proceeds optionally to 704 where the orthogonal tones are erased. Next, or directly from 703 if optional erasure 704 is not used, at 705 respective write delays are determined and stored, to be used during later synchronous writing operations.

For example, as to two adjacent tracks to be written synchronously, if the two phase offsets are both 0, then no write delays (or identical write delays) are used. If the two phase offsets are not both 0 (even if they are the same as discussed below), then each phase offset is converted to a respective write delay. Because the two orthogonal tones used to determine the relative phases have different periods, the delay for each track is determined based on those periods. Thus, for example, if each track has a phase of $\pi/8$, that does not mean that both delays are the same. Rather, one delay would by $(\pi/8)4T/2\pi=T/4$ and one delay would by $(\pi/8)6T/2\pi=3T/8$. And of course, if the phases are different, the delays would be computed similarly.

Figure 8:
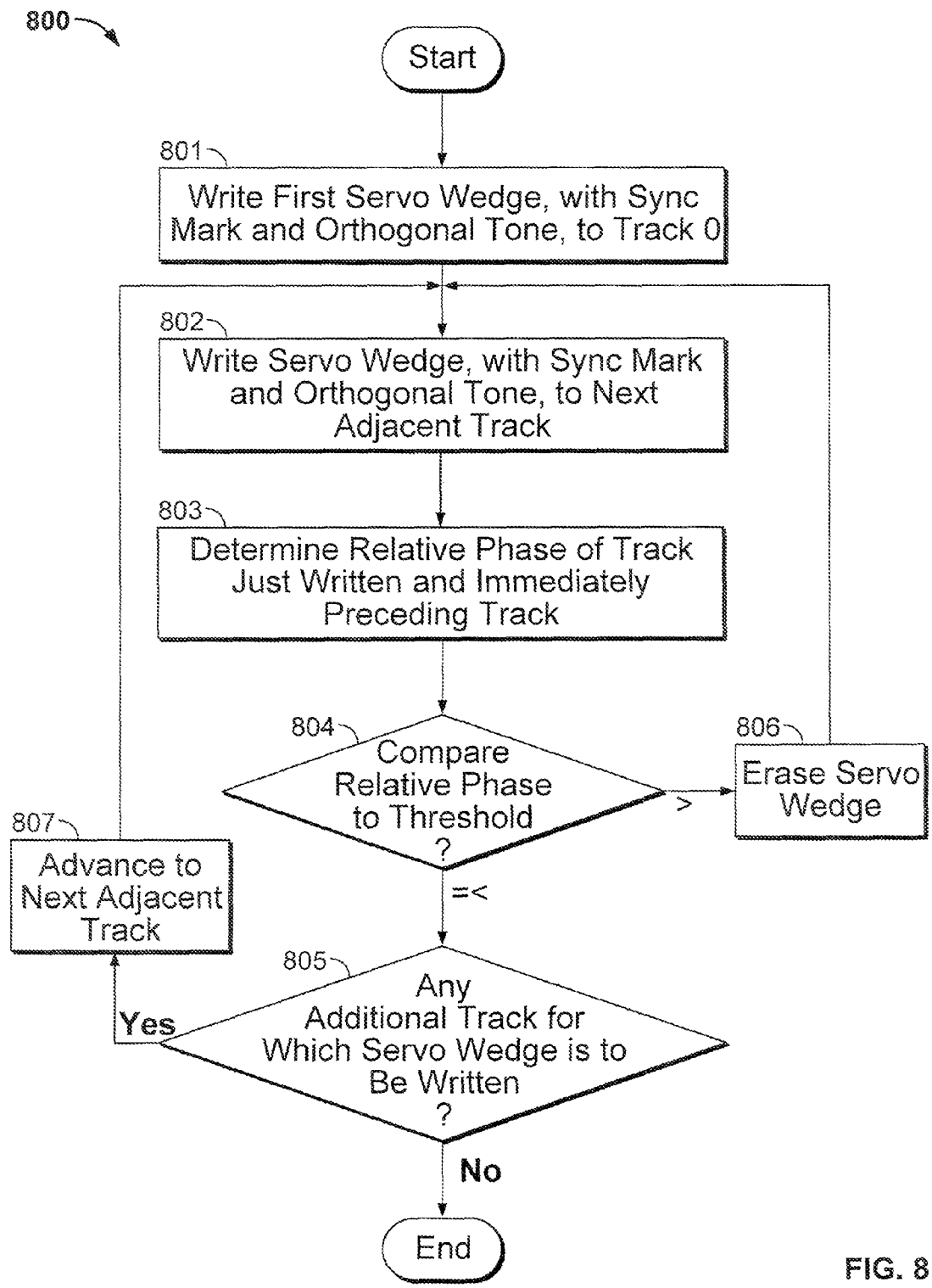

In an alternative mode of operation, a method 800 according to this disclosure, diagrammed in FIG. 8, can be used to write sync marks that are synchronous from one track to the next, eliminating the need to determine individual write delays.

Method 800 begins at 801 where a first servo wedge, including a sync mark, is written to Track 0. An orthogonal tone is included; according to the examples above, insofar as Track 0 is an even-numbered track, the orthogonal tone has a 2T pattern. Next, at 802, a servo wedge is written to the next adjacent track, including a sync mark and the appropriate orthogonal tone (e.g., 2T or 3T). At 803, the relative phase of the track whose servo wedge has just been written (the "next adjacent track" of the previous sentence), and the track whose servo wedge was written immediately prior is determined.

At 804, the relative phase is compared to a threshold that depends on the drive's design budget for the degree of residual (uncorrected) radial incoherence that can be tolerated in the synchronous writing of adjacent tracks. If the relative phase is less than or equal to the threshold, the sync marks for this pair of adjacent tracks are considered to be sufficiently synchronous, and at 805 it is determined whether there is any additional track for which a servo wedge needs to be written. If at 804 the relative phase exceeds the threshold, the sync marks for this pair of adjacent tracks are considered to be insufficiently synchronous, and method 800 proceeds to 806 where the servo wedge that was just written may be erased, and then returns to 802 to write the servo wedge again.

If at 805 it is determined that there is no additional track for which a servo wedge needs to be written, then method 800 ends. If at 805 is determined that there is an additional track for which a servo wedge needs to be written, then at 807 method 800 advances to the additional track and returns to 802 to write the servo wedge.

Because in method 800 no servo wedge is allowed to remain in place unless adjacent tracks are considered sufficiently synchronous, after completion of method 800 the resulting track on the disk have synchronous sync marks, and no processing is required at write time to assure synchronous data writing; a fixed delay following the sync mark on each track will result in synchronous data.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of operating a storage device having a storage medium platter, the method comprising:
    writing servo data to the storage medium platter, the servo data including, for each track on the storage medium platter:
    a servo sync mark, and
    a repeating pattern;
    for each pair of adjacent tracks on the storage medium platter, comparing the repeating patterns, on adjacent tracks in the pair of adjacent tracks, to determine relative phase of the repeating patterns on adjacent tracks; and
    recording the relative phase for each pair of adjacent tracks.

2. The method of claim 1 wherein the writing of the repeating pattern comprises prepending the repeating pattern to the servo data.

3. The method of claim 1 wherein the writing of the repeating pattern comprises appending the repeating pattern to the servo data.

4. The method of claim 1 wherein, for each pair of adjacent tracks on the storage medium platter, the repeating patterns on adjacent tracks in the pair of adjacent tracks are orthogonal to one another.

5. The method of claim 4 wherein the writing of the repeating patterns, on adjacent tracks in the pair of adjacent tracks, that are orthogonal to one another comprises writing repeating patterns, on adjacent tracks in the pair of adjacent tracks, that have periods that are not multiples of each other.

6. The method of claim 4 wherein the comparing the repeating patterns, on adjacent tracks in the pair of adjacent tracks, to determine relative phase of the repeating patterns on adjacent tracks, comprises I/Q demodulating the repeating patterns.

7. The method of claim 6 wherein:
    the writing of the repeating patterns, on adjacent tracks in the pair of adjacent tracks, that are orthogonal to one another comprises writing repeating patterns, on adjacent tracks in the pair of adjacent tracks, that have periods that are not multiples of each other; and
    the I/Q demodulating the repeating patterns comprises integrating over a common multiple of the periods.

8. The method of claim 1 further comprising writing data synchronously to a pair of adjacent tracks; wherein the writing data synchronously comprises:
    retrieving the relative phase that was recorded for the pair of adjacent tracks;
    deriving from the recorded relative phase a respective delay for each track in the pair of adjacent tracks; and
    for each respective track in the pair of adjacent tracks:
    detecting the sync mark for the respective track, and
    delaying writing by the respective delay following the sync mark.

9. A method of calibrating a storage device having a storage medium platter, the method comprising:
    writing servo data to the storage medium platter, the servo data including, for each track on the storage medium platter:
    a servo sync mark, and
    a repeating pattern;
    for each pair of adjacent tracks on the storage medium platter, comparing the repeating patterns, on adjacent tracks in the pair of adjacent tracks, to determine relative phase of the repeating patterns on adjacent tracks; and
    recording the relative phase for each pair of adjacent tracks.

10. The method of claim 9 wherein the writing of the repeating pattern comprises prepending the repeating pattern to the servo data.

11. A storage device having a storage medium platter and calibrated according to a method comprising:
    writing servo data to the storage medium platter, the servo data including, for each track on the storage medium platter:
    a servo sync mark, and
    a repeating pattern;
    for each pair of adjacent tracks on the storage medium platter, comparing the repeating patterns, on adjacent tracks in the pair of adjacent tracks, to determine relative phase of the repeating patterns on adjacent tracks; and
    recording the relative phase for each pair of adjacent tracks.

12. The storage device of claim 11 calibrated according to the method wherein the writing of the repeating pattern comprises prepending the repeating pattern to the servo data.

13. The storage device of claim 11 calibrated according to the method wherein the writing of the repeating pattern comprises appending the repeating pattern to the servo data.

14. The storage device of claim 11 wherein for each pair of adjacent tracks on the storage medium platter, the repeating patterns on adjacent tracks in the pair of adjacent tracks are orthogonal to one another.

15. The storage device of claim 14 calibrated according to the method wherein the writing of the repeating patterns, on adjacent tracks in the pair of adjacent tracks, that are orthogonal to one another comprises writing repeating patterns, on adjacent tracks in the pair of adjacent tracks, that have periods that are not multiples of each other.

16. The storage device of claim 14 calibrated according to the method wherein the comparing the repeating patterns, on adjacent tracks in the pair of adjacent tracks, to determine relative phase of the repeating patterns on adjacent tracks, comprises I/Q demodulating the repeating patterns.

17. The storage device of claim 16 calibrated according to the method wherein:

the writing of the repeating patterns, on adjacent tracks in the pair of adjacent tracks, that are orthogonal to one another comprises writing repeating patterns, on adjacent tracks in the pair of adjacent tracks, that have periods that are not multiples of each other; and the I/Q demodulating the repeating patterns comprises integrating over a common multiple of the periods.

18. A method of calibrating a storage device having a storage medium platter, the method comprising:

writing first servo data to a first track of the storage medium platter, the first servo data including:
a first servo sync mark, and
a first repeating pattern;

writing second servo data to a second track of the storage medium platter adjacent to the first track, the second servo data including:
a second servo sync mark, and
a second repeating pattern;

comparing the first and second repeating patterns to determine relative phase of the first and second repeating patterns;

when the relative phase of the first and second repeating patterns exceeds a threshold, erasing the second servo data, writing new second servo data, and repeating the comparing and erasing until the relative phase of the first and second repeating patterns is less than the threshold; and for each respective subsequent track:
writing respective subsequent servo data to a respective subsequent track of the storage medium platter adjacent to a preceding track, the respective subsequent servo data including:
a respective subsequent servo sync mark, and
a respective subsequent repeating pattern;
comparing the respective subsequent repeating pattern and the immediately preceding respective subsequent repeating pattern to determine relative phase of the respective subsequent repeating pattern and the immediately preceding respective subsequent repeating pattern;
when the relative phase of the respective subsequent repeating pattern and the immediately preceding respective subsequent repeating pattern exceeds a threshold, erasing the respective subsequent servo data, writing new respective subsequent servo data, and repeating the comparing and erasing of the respective subsequent servo data until the relative phase of the respective subsequent repeating pattern and the immediately preceding respective subsequent repeating pattern is less than the threshold.

19. The method of claim 18 wherein:
the first and second repeating patterns are orthogonal to one another; and
each respective subsequent repeating pattern is orthogonal to an immediately preceding respective subsequent repeating pattern.

* * * * *